Jan. 11, 1938.　　　　J. B. BRENNAN　　　　2,104,732
ELECTROLYTE
Filed July 26, 1934
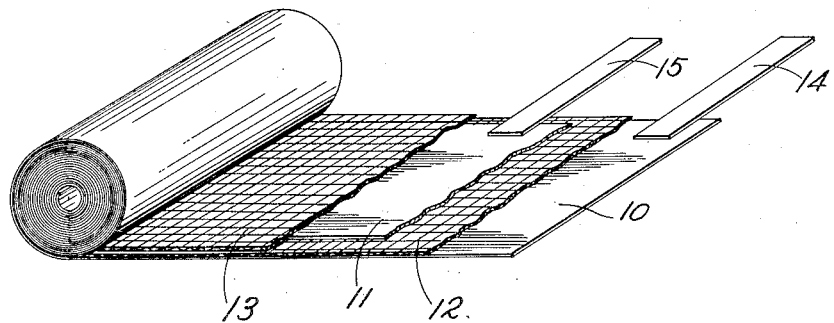
INVENTOR.
JOSEPH B. BRENNAN
BY
ATTORNEYS Patented Jan. 11, 1938

2,104,732

UNITED STATES PATENT OFFICE 2,104,732

ELECTROLYTE

Joseph B. Brennan, Fort Wayne, Ind.

Application July 26, 1934, Serial No. 737,086

8 Claims. (Cl. 175—315)

This invention relates to electrolytic devices such as electrolytic condensers, rectifiers or lightning arresters of the type embodying one or more film formed electrodes and is particularly useful on alternating current circuits wherein two or more film formed electrodes are used. Condensers of this type may find application in filtering ripple on circuits used in communication systems as well as wherein one or more cathodes are without the dielectric film and wherein one or more anodes possess a dielectric film.

I also find that electrolytes of the type described in this invention are useful on either A. C. or D. C. circuits and for voltages up to approximately 500 volts and that electrolytes made as described herein are extremely long lived on raw A. C. circuit. On alternating currents as for example in conjunction with electric motors for power factor correction, I find it good practice to use two or more strips or plates of aluminum foil as electrodes, on which strips or plates a dielectric film is formed by customary and well known means electrolytically and to arrange said strips or plates of film forming metal with spacers and electrolyte therebetween, each of the strips or plates having electric contactors leading therefrom as is customary.

In the drawing I have illustrated a condenser of the type described, parts being broken away to show the construction thereof. As indicated in the drawing, the condenser may comprise strips or plates 10 and 11 of aluminum foil or other suitable film forming material, spacers 12 and 13 being employed to separate the strips. Electrical contact may be made with the electrode strips by means of the terminals 14 and 15.

Preferably the spacers 12 and 13 comprise a cotton fabric such as mosquito netting impregnated with a compound insoluble in the electrolyte such as rubber cement, latex solution or other suitable materials which are insoluble in the electrolyte.

The impregnated netting functions to prevent contact between the electrode foils 10 and 11 and further functions to retain the electrolyte between the foils in the interstices of the netting. The assembled parts may be rolled into cylindrical form as shown in the drawing, and if desired the completed assembly may be protected by inserting the same in a suitable container.

The electrolyte for low voltage use which is especially useful on A. C. circuits has for example the following composition:

First a solution of ammonium lactate is made by adding 160 cc. of 28% ammonium hydroxide to 350 cc. of 48% lactic acid the resulting solution being slightly alkaline.

Then ammonium borate is made by adding 140 cc. of ammonium hydroxide to 560 grams of boric acid.

Then to the above amount of ammonium borate 440 cc. of the above ammonium lactate solution are added and in addition 304 grams of boric acid are added and then this mixture is heated to approximately 106° C. while being agitated.

This paste may be applied by well known means to foils or to plate electrodes or to sprayed metal electrodes of various constructions either with woven cloth spacers of linen, silk or wool or asbestos or with porous or perforated rubber or gelatine spacers or preferably with spacers of netting impregnated with a gelatine solution as above described or a casein solution or a rubber solution.

I find also that the addition of an amyloform solution to the above electrolyte is useful in the following quantities and made up in the following proportions: 20 cc. of 40% formaldehyde solution is added to 20 grams of starch and allowed to stand for a time and to this starch formaldehyde combination water is added to the amount of about 250 cc. and after heating and stirring a paste results which if added to the above specified amounts of ammonium lactate and ammonium borate and boric acid mixture renders said mixture somewhat more homogeneous and stable.

In the above starch and water and formaldehyde solution, I find that the starch itself acts as a homogenizing agent and may be used without formaldehyde addition but I believe that the addition of formaldehyde renders the starch solution less likely to char on exposure to heat.

What I claim is:

1. A method of making electrolytes adapted for use in electrolytic condensers which includes the steps of making a solution of ammonium lactate by adding ammonium hydroxide to lactic acid in substantially the proportion of 160 cc. of 28% hydroxide to 250 cc. of 48% of lactic acid, making a solution of ammonium borate by adding substantially 140 cc. of ammonium hydroxide to 560 grams of boric acid, adding to the ammonium borate solution 440 cc. ammonium lactate solution and about 300 grams of boric acid and heating the mixture to approximately 106° C.

2. A method according to claim 1 including the additional step of adding to the solution produced by the method of claim 1 about 250 cc. of amyloform solution prepared by adding 20 cc. of 40% formaldehyde solution to 20 grams of starch and water in the amount of about 250 cc.

3. An electrolyte for electrolytic condensers consisting of a mixture of ammonium borate, ammonium lactate, boric acid and water.

4. An electrolyte in accordance with claim 3 having added thereto a solution of a polysacharide and formaldehyde.

5. An electrolyte for an electrolytic condenser consisting principally of a solution of ammonium lactate, ammonium borate and boric acid.

6. An electrolyte for electrolytic condensers consisting principally of a solution of ammonium lactate, ammonium borate and boric acid and containing a homogenizing agent consisting of a polysacharide and formaldehyde.

7. An electrolyte for electrolytic condensers consisting of a solution of ammonium lactate, a film forming inorganic acid, and a salt thereof.

8. An electrolyte for electrolytic condensers consisting principally of a solution of ammonium lactate, boric acid and a salt thereof, and having added thereto a solution of a polysacharide and formaldehyde.

JOSEPH B. BRENNAN.